ANTONIO SUPPERNIO.
Improvement in Musical Cages for Animals.

No. 122,138.  Patented Dec. 26, 1871.

Witnesses.
W. L. Bennem
Louis Seaman

Inventor.
Antonio Suppernio
by his Attorney
E. S. Renwick

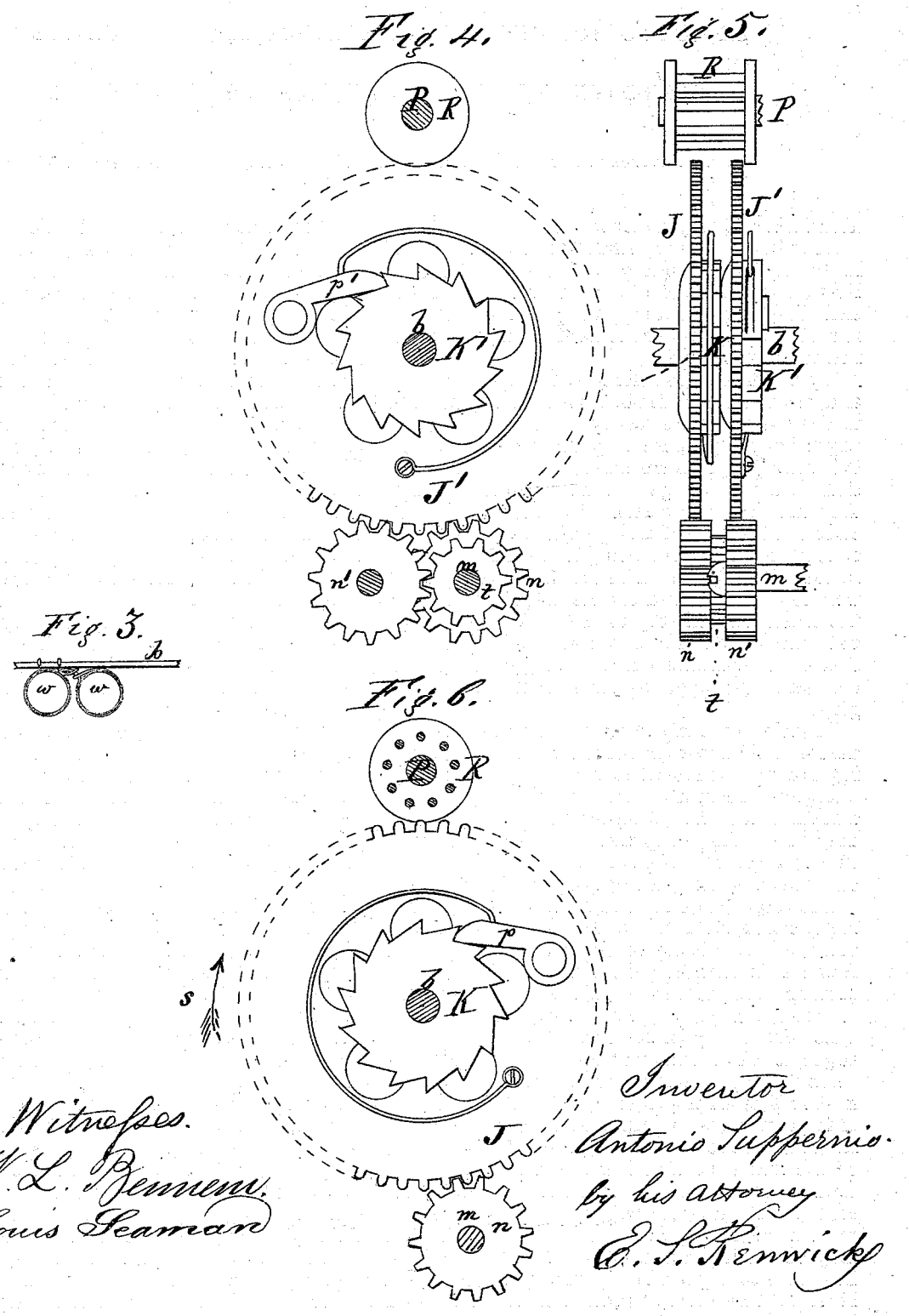

UNITED STATES PATENT OFFICE.

ANTONIO SUPPERNIO, OF MILLBURN, NEW JERSEY.

IMPROVEMENT IN MUSICAL CAGES FOR ANIMALS.

Specification forming part of Letters Patent No. 122,138, dated December 26, 1871.

*To all whom it may concern:*

Be it known that I, ANTONIO SUPPERNIO, of Millburn, in the county of Essex and State of New Jersey, have made an Invention of a Musical Cage for Animals; and that the following is a full, clear, and exact description and specification of the same.

My invention has reference to cages for birds and other small animals; and its object is to utilize the force exerted by the animals in such cages for the purpose of producing music. To this end my invention consists of certain combinations of a rotary cage with a music-box, through the introduction of certain means specified in the claims at the close of this specification, the effects of these combinations being to prevent breakage in case the cage be turned in the reverse direction to that required for the music-box, to stop the music, and to stop the rotation of the cage, or to turn it by hand. My invention consists further of the combination of the rotary cage with a stationary support within it for the food-cup or glass.

In order that my invention may be fully understood, I have represented in the accompanying drawing a musical bird-cage embodying it.

Figure 1:
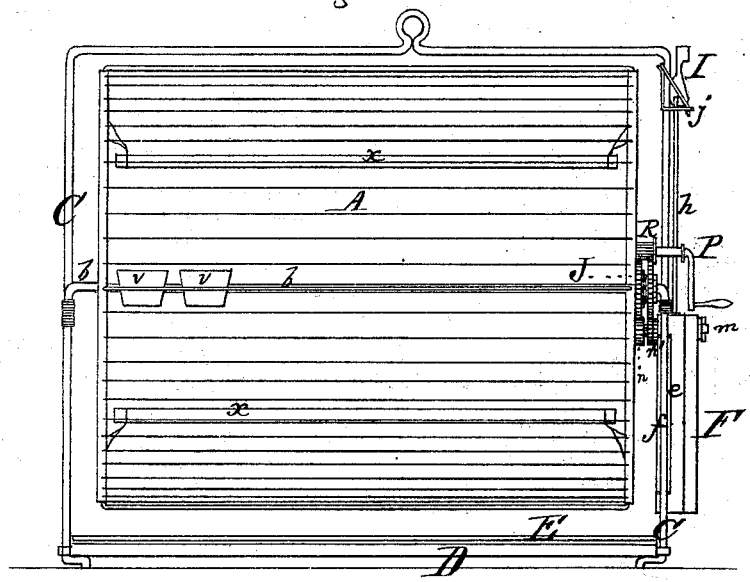
Figure 2:
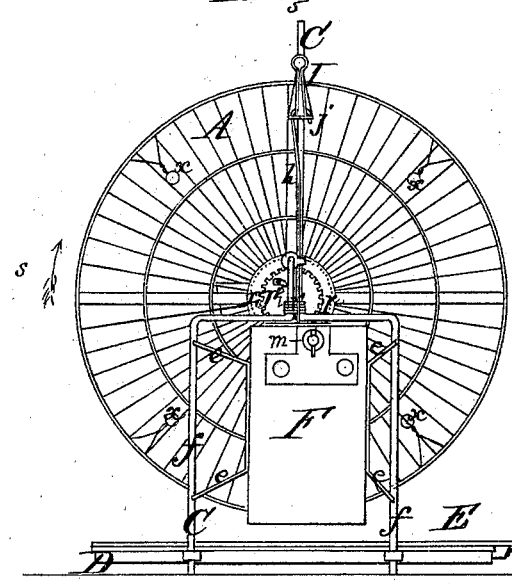

Figure 1 represents a side view of the cage on a small scale. Fig. 2 represents an end view of the same. Fig. 3 represents a view of the stationary support. Figs. 4 to 6, inclusive, represent views of the gearing greatly enlarged.

The rotary cage A consists of a drum of wire-rods, constructed to revolve upon a stationary shaft, $b$, which is supported by a frame, C. The frame C is connected with a base, D, which by preference is provided with a removable tray, E, to catch droppings from the cage above. The base also is, by preference, made with raised edges, to prevent the scattering of the droppings when the tray is removed for cleansing. The music-box F is arranged at one end of the frame C. It is provided with spring-slides $e$, which are arranged to slide upon the upright standards $f\ f$ of the frame, so that the box may be raised or depressed. It is also connected, by a rod, $h$, with an eccentric lever, I, which is arranged to rock upon a bracket, $j$, above, so that the music-box may be readily raised or lowered, and may be held in either position by the operation of the lever I. The driving-shaft $m$ of the music-box F is fitted with a pinion, $n$, whose teeth, (when the box is held in its highest position by the lever I) engage with those of a cog-wheel, J, which is constructed to turn upon a tubular journal projecting from the hub $r$ of the adjacent head of the cage; and the side of this cog-wheel has a pawl, $p$, pivoted to it in a proper position to engage with the teeth of a ratchet-wheel, K, which is made fast to the tubular journal of the cage. Hence, when the cage is turned in the direction of the arrow $s$, (Figs. 2 and 6,) the driving-shaft $m$ of the music-box is turned and music is played. If, however, the animals in the cage should turn the cage in the reverse direction, or backward, the ratchet-teeth of the ratchet-wheel slip past the pawl $p$ without applying force to the shaft of the music-box, and consequently breakage is prevented. The ratchet may, if preferred, be arranged in a different manner for the same purpose. In order to render the turning of the cage in the reverse direction to that indicated by the arrow $s$, or backward, available, the tubular journal is fitted with a second ratchet-wheel, K', having its teeth pointing in the opposite direction to those of the first. A second cog-wheel, J', also, is provided to turn upon the tubular journal, and is fitted with a pawl, $p'$. The teeth of this second wheel J' engage with those of a pinion, $n'$, which is constructed to revolve upon a stud projecting from the side of the music-box F in a piston, to engage with the teeth of a second pinion, $t$, upon the driving-shaft $m$ of the music-box. The effect of the intermediate pinion $n'$ is to reverse the motion imparted by the driving-wheel J', so that the shaft of the music-box is turned in the proper direction through the intervention of the wheel J' and its connections, although the cage is turned backward. The second ratchet-wheel K in this arrangement prevents the breakage of the cog-teeth when the cage is turned forward. As the music-box is arranged to slide up and down upon the standards of the frame C, the lowering of it disengages the teeth of the pinions $n\ n'$ from their respective cog-wheels J J', thus stopping the music. In order to lock the cage on such occasions, or to enable it to be turned by hand to bring the door in a convenient position for any required purpose, a pinion, R, is secured to a crank-shaft, P, which is arranged to turn in bearings secured to the rod $h$ above the cog-wheels J J' in such position relatively to the two cog-wheels J J' that when the music-box F is lowered the teeth of the pinion R are engaged with those of the cog-wheels J J'. Thereupon the cage may either be turned by turning the crank-shaft P by its handle, or may be held stationary by holding the crank-shaft. The engagement of the teeth of both cog-wheels simultaneously with those of the same pinion R prevents their movement when the said pinion is held stationary. In order to hold the food for the animals, the stationary shaft $b$ is provided with one or more wire rings, $w$, Fig. 3, in which the cups $v\ v$, Fig. 1, for food and water, are held. The adjacent head of the wire drum is fitted with a wire door (secured by a spring catch) to permit access to the interior of the cage. The interior of the cage, when it is to be used for birds, is fitted with a series of perches, $x$, upon which birds perch. As these are arranged near the periphery of the cage, the weight of the birds perching upon them turns the cage and sets the mechanism of the music-box in motion.

The music-box may be constructed in the ordinary manner, which is too well known to need description.

I claim as my invention, and desire to secure by Letters Patent—

1. The combination of the rotary cage with the music-box and the ratchet, substantially as before set forth.
2. The combination of the rotary cage with the music-box and the slides, (which permit the music-box to be thrown out of gear with the rotary cage,) substantially as before set forth.
3. The combination of the rotary cage, and the music-box, and the slides with the eccentric lever, (for moving the music-box into and out of gear with the cage,) substantially as before set forth.
4. The combination of the rotary cage with the crank-shaft (for turning it by hand) by means of a cog-wheel and pinion, substantially as before set forth.
5. The combination of the rotary cage and the stationary shaft thereof with the support for the food-cup within the cage, substantially as before set forth.

Witness my hand this 29th day of August, A. D. 1871.

ANTONIO SUPPERNIO.

Witnesses:
  L. G. BARNARD,
  ISAAC BRIANT.

(102)